United States Patent [19]

Causyn et al.

[11] Patent Number: 5,436,285

[45] Date of Patent: Jul. 25, 1995

[54] RECYCLED RUBBER IN A POLYMER MODIFIED ASPHALT AND A METHOD OF MAKING SAME

[76] Inventors: David Causyn, 23 Romney Road, Islington, Ontario, Canada, M9A 4E9; Krystina Thys, No. 819 Rang 8, St. Jovite, Quebec, Canada, J0T 2H0

[21] Appl. No.: 90,144

[22] PCT Filed: Jun. 5, 1992

[86] PCT No.: PCT/CA92/00235

§ 371 Date: Jul. 26, 1993

§ 102(e) Date: Jul. 26, 1993

[87] PCT Pub. No.: WO92/21820

PCT Pub. Date: Dec. 10, 1992

[30] Foreign Application Priority Data

Jun. 5, 1991 [GB] United Kingdom ............... 9112035

[51] Int. Cl.⁶ ................................. C08L 95/00
[52] U.S. Cl. ........................ 524/68; 521/41; 521/45.5; 524/71
[58] Field of Search ............... 521/40, 40.5, 41, 45.5; 524/68, 69, 71, 59

[56] References Cited

U.S. PATENT DOCUMENTS

| | | | |
|---|---|---|---|
| 3,338,849 | 8/1967 | Johnson | 524/68 |
| 4,381,357 | 4/1983 | von der Wettern et al. | 524/68 |
| 4,427,376 | 1/1984 | Etnyre et al. | 432/105 |
| 4,588,634 | 5/1986 | Pagen et al. | 524/71 |

FOREIGN PATENT DOCUMENTS

| | | | |
|---|---|---|---|
| 1143753 | 3/1985 | Belarus | 524/68 |
| 2019260 | 6/1991 | Canada . | |
| 1285350 | 7/1991 | Canada . | |
| 0099864 | 2/1984 | European Pat. Off. . | |
| 2580658 | 10/1986 | France . | |
| 0036548 | 4/1981 | Japan | 524/59 |
| 1407229 | 9/1975 | United Kingdom . | |

*Primary Examiner*—Peter A. Szekely
*Attorney, Agent, or Firm*—Jeffrey T. Imai; D. Doak Horne; Arne I. Fors

[57] ABSTRACT

An improved paving composition includes between 89-93% graded aggregate, 5.76% asphalt cement, 0.24% SBR polymer and 1-5% graded recycled crumb rubber. The asphalt cement and SBR polymer are blended and heated to form a first mixture. The aggregates are blended and heated to form a second mixture. The two mixtures are blended together prior to the addition of the graded recycled crumb rubber.

17 Claims, No Drawings

RECYCLED RUBBER IN A POLYMER MODIFIED ASPHALT AND A METHOD OF MAKING SAME

FIELD OF INVENTION

This invention relates to a composition and method of manufacturing asphalt having improved performance characteristics. In particular, this invention relates to a paving composition comprising recycled crumb rubber in a polymer modified asphalt and a method of making same.

BACKGROUND OF THE INVENTION

Asphalt is the principal material used for constructing roads. A standard mix of asphalt generally comprises approximately 94% grade aggregate and 6% asphalt cement. The standard mix is prone to rutting and cracking. While the standard mix is initially low in cost, it has a high maintenance cost and it contains no recycled materials.

Many attempts have been made to improve the wear characteristics of the roads. Materials such as polyethylene, glass, sand and drywall have been added to the asphalt to improve its characteristics. The use of these materials and their ineffectiveness is widely known and documented.

Previous attempts have failed to differentiate between the problems associated with rutting, ductility, tensile strength, elasticity and adhesion, referred to as the polymer related properties and the problems associated with post compaction rutting and durability, referred to as aggregate related.

Styrene Butadiene Rubber latex (SBR) has been added to asphalt for road construction. A polymer modified mix generally comprises approximately 94% graded aggregate, 5.76% asphalt cement and 0.24% polymer, either SBR or an equivalent polymer such as the polymers available under the trademarks KRATON SBS, STYRELF SBS, GOODRICH and BASF SBR and DUPONT EVA.

The addition of SBR to the asphalt results in improved crack resistance and heat rutting resistance over the standard mix of asphalt. However, the addition of SBR does not have a significant effect on the polymer modified asphalt's ability to resist post compaction rutting. Further, although the polymer modified asphalt is low in maintenance, it is expensive to manufacture and does not contain any recycled materials.

Attempts have been made to add rubber to the standard asphalt mix. A rubber modified mix generally comprises approximately 90% grade aggregate, 7% asphalt cement and 3% rubber.

The rubber modified asphalt contains recycled material and has good post compaction characteristics. However in practise, the rubber modified asphalt fails frequently, has a high rate of maintenance since it exhibits poor aggregate adhesion, poor heat rutting and poor crack resistance characteristics.

The addition of rubber to asphalt hash not been satisfactory since there are three major disadvantages in using rubber in asphalt. First, fine rubber melts during processing diminishing its desired aggregate enhancing properties. Second, porous rubber absorbs the asphalt cement thus reducing the asphalt's ability to bond the aggregate. Third, if the grade of rubber is too large processing of the asphalt can become difficult.

Traditionally, asphalt is manufactured by heating and mixing the components together to form a slurry which can be deposited onto a road surface for compaction. However, the mere addition of rubber in a polymer modified asphalt (as illustrated in EP-A-0 049 485 and FR-A-2 580 658) using the traditional method does not produce suitable results.

SUMMARY OF INVENTION

The disadvantages of the prior art may be overcome by adding graded crumb-rubber to a polymer modified asphalt. In particular, the disadvantages of the prior art may be overcome by using a paving composition comprising graded aggregate, asphalt cement, polymer and graded recycled crumb rubber.

It is also desirable to manufacture a polymer modified asphalt including a graded recycled crumb rubber by preparing an aggregation of asphalt and polymer and heating the aggregation, adding and mixing a graded recycled crumb rubber into the aggregation prior to depositing the paving composition onto a road surface for compaction as pavement.

According to one aspect of the invention, there is provided a composition comprising between 89–93% graded aggregate, 5.76% asphalt cement, 0.24% polymer and 1–5% graded recycled crumb rubber.

According to another aspect of the invention, there is provided a method of manufacturing the paving composition of the present invention including the steps of:

preparing an asphalt mixture of asphalt cement and a suitable polymer;

heating the asphalt mixture to and maintaining the mixture at a predetermined temperature;

preparing an aggregate mixture of coarse gravel, fine gravel and sand;

heating the aggregate mixture to and maintaining the mixture at a predetermined temperature;

blending the two mixtures to form a slurry;

adding a graded recycled crumb rubber and blending the rubber into the mixture prior to application for a road surface.

DETAILED DESCRIPTION OF THE INVENTION

Recycled crumb rubber can be graded according to the size of the crumb, its shape and type. It has been found that the following types/shapes of crumb rubber are suitable for the present invention:

ambient/amorphous
cryogenic/sharp/square
thermo-friction/round
tire treads/elongated.

The rubber is recovered from recycling sources such as discarded automobile tires and is processed to produce crumbs of rubber. The rubber crumbs are then sifted to grade the rubber according to mesh size.

The size of crumb rubber which is suitable for the present invention is from between 2 to 100 mesh. The finer size of recycled crumb rubber is preferred with the best results being experienced at 10 to 20 mesh.

The characteristics which are exhibited by each of the above examples of crumb rubber is that the surface characteristics of the crumb is clean and substantially free of burrs. The burrs on the surface of a crumb will melt during processing limiting the effectiveness of the rubber additive to the polymer modified asphalt. Therefore any crumb rubber which has a substantially smooth surface after production thereof would be suitable for the present invention.

The amount of crumb rubber in the paving composition of the present invention can be between 0.5% to 7% by weight. The most improved characteristics over standard asphalt has been found to be 1% to 5%.

Recycled rubber may include a carbon fibre component. Such recycled rubber would be suitable to be included in the asphalt mix provided that the carbon fibres are not curled or fluffed.

Traditionally, asphalt has been prepared by heating and mixing the components together to form a slurry which can be deposited onto a road surface for compaction into a pavement. However, the asphalt made using the traditional method does not produce suitable results for the present invention. If the mixture and rubber are heated together, the rubber will melt and will tend to combine with the asphalt cement and not with the binders, i.e. the aggregates, causing the aggregates to precipitate out of the slurry.

The paving composition of the present invention is manufactured by first preparing a polymer modified asphalt mixture by blending predetermined amounts of asphalt cement and a suitable SBR polymer and by preparing an aggregate mixture of coarse gravel, fine gravel and sand. The preferred polymer modified asphalt includes 4% to 8% by weight asphalt cement, 86.5% to 93% graded aggregate and 0.1% to 0.5% SBR.

It must be stressed that similar results can be achieved using other types of polymer. Chemical equivalents of SBR may be used with suitable results. These equivalents are available under the various trademarks and include KRATON SBS, STYRELF SBS, GOODRICH and BASF SBR and DUPONT EVA. Further, recent developments in Modified Asphalt Cement have been documented in Canadian Patent Application no. 2,019,160, published Jun. 18, 1991 and therefore the present invention is not limited to the particular type of polymer.

The asphalt mixture and the aggregate mixtures are heated and maintained at a predetermined temperature and then blended together to form a slurry. An amount of a graded crumb rubber is added and blended into the mixture prior to application for paving, compaction and curing.

The graded recycled crumb rubber is added to the polymer modified asphalt without heating. The resulting paving composition is then immediately delivered to a paving site where it is deposited and spread to cover a paving area. The composition is then compacted to form pavement.

In most cases, the rubber will not have heated sufficiently to melt and combine with the asphalt cement. If the holding time where the paving composition stands while being heated exceeds the normal curing time of the polymer modified asphalt, then on site mixing should be used to reduce the time between the addition of the rubber and the time of spreading and compaction.

The invention can best be described by way of the following example.

An asphalt sample was made using commercially available materials. The sample was made using 60.14 grams of AC 20 asphalt cement, heated to a temperature of 160° C., blended with 1.86 grams of BASF Butonal NS 175 polymer, then re-heated to 160° C. An aggregate containing 713.42 grams of coarse gravel, 143.60 grams of fine gravel and 60.98 grams of C 109 silica sand was blended and heated to 160° C.

The slurry was heated to a temperature of about 100° C. to about 160° C. to thoroughly and evenly disperse and dissolve the ingredients.

When both mixtures achieved the predetermined temperature, the graded aggregate and polymerized asphalt cement were blended to form a uniform slurry. The recycled crumb rubber was added to the slurry and mixed thoroughly and deposited into moulds for compaction. The samples were then removed from the mould and various tests were undertaken.

Three separate samples were prepared having 10 grams, 21 grams and 31 grams of graded crumb rubber, respectively, 1%, 2% and 3% rubber by weight.

The types of samples which were prepared used the following types of recycled rubber:

Coarse (C)=4–6 mesh
Medium (M)=6–8 mesh
Fine (F)=8–10 mesh
Ultra Fine (UF)=10–20+mesh The rubber was added to the pre-heated and pre-blended mixture.

The rubber and mixture was further blended before compacting to simulate a road surface. The samples were then tested for tensile strength peak loading and strain to failure. The results are listed in Table 1.

TABLE 1

| RUBBER MESH SIZE | PERCENTAGE RUBBER | TENSILE STRENGTH PEAK LOAD (lbs.) | STRAIN TO FAILURE (inches) |
|---|---|---|---|
| UF | 1 | 1250 | 0.13 |
| UF | 2 | 950 | 0.165 |
| UF | 3 | 544 | 0.265 |
| F | 1 | 1429 | 0.175 |
| F | 2 | 926 | 0.215 |
| F | 3 | 894 | 0.275 |
| M | 1 | 1412 | 0.135 |
| M | 2 | 891 | 0.205 |
| M | 3 | 818 | 0.250 |

The same tests were conducted against conventional AC 20 asphalt, polymer modified asphalt and rubber added asphalt. Polymer modified asphalt had a tensile strength of 868 lbs. and a strain to failure ratio of 0.060 inches. AC 20 asphalt, which is the standard, has a tensile strength of 1353 lbs. and a strain to failure ratio of 0.075 inches. Rubber modified asphalt, with 1% rubber, has a tensile strength of 706 lbs. and a strain to failure ratio of 0.030 inches.

If the acceptable strain to failure ratio is the same as that of regular asphalt, the size of the crumb rubber can range between 4.5 mesh to 22 mesh size. The best results were achieved at 8 to 10 mesh size with the optimum at 9 mesh.

It will be obvious to those skilled in the art that various modifications and changes can be made to the asphalt and method of producing same without departing from the scope of this invention as defined in the appended claims.

We claim:

1. A paving composition comprising:
   4% to 8% by weight, asphalt cement,
   0.1% to 0.5% by weight, polymer,
   1% to 5% by weight, crumb rubber and
   a balance of graded aggregate,
   wherein said asphalt cement and said polymer and said graded aggregate are pre-blended and heated prior to the addition of the crumb rubber.

2. A paving composition as claimed in claim 1 wherein said polymer is a styrene butadiene rubber (SBR).

3. A paving composition as claimed in claim 2 wherein said composition includes 5.76% asphalt cement, 91% to 93% graded aggregate, 0.1% to 0.5% SBR and 1% to 3% crumb rubber.

4. A paving composition as claimed in claim 2 wherein said composition includes 5.76% asphalt cement, 91% to 93% graded aggregate, 0.24% SBR and 1% to 3% crumb rubber.

5. A paving composition as claimed in claim 2 wherein said composition includes 5.76% asphalt cement, 93% graded aggregate, 0.24% SBR and 1% crumb rubber.

6. A paving composition as claimed in claim 1 wherein said rubber has a mesh size of between 4 to 100.

7. A paving composition as claimed in claim 2 wherein said mesh size is between 6 to 20.

8. A paving composition as claimed in claim 2 wherein said mesh size is between 8 to 10.

9. A paving composition as claimed in claim 1 comprising 5.76% by weight asphalt cement, 93% graded aggregate, 0.24% SBR polymer and 1% crumb rubber, said crumb rubber having a mesh size of between 8 to 10.

10. A method of forming a paving composition having improved strength and ductility characteristics, said paving composition comprises 4% to 8%, by weight, asphalt cement, 0.1% to 0.5%, by weight, polymer, 1% to 5%, by weight, crumb rubber and a balance of graded aggregate, the method comprising the steps of:

blending an asphalt mixture of asphalt cement and a polymer;
heating the asphalt mixture to and maintaining the mixture at a predetermined temperature;
blending said graded aggregate, comprising a mixture of coarse gravel, fine gravel and sand;
heating the aggregate mixture to and maintaining the mixture at a predetermined temperature;
blending the two mixtures to form a slurry;
adding a graded rubber and blending the rubber into the slurry prior to application for a road surface.

11. A method as claimed in claim 10 wherein said composition comprises 5.76% asphalt cement, 91% to 93% graded aggregate, 0.1% to 0.5% polymer and 1% to 3% crumb rubber.

12. A method as claimed in claim 10 wherein said composition comprises 5.76% asphalt cement, 91% to 93% graded aggregate, 0.24% polymer and 1% to 3% crumb rubber.

13. A method as claimed in claim 10 wherein said composition comprises 5.76% asphalt cement, 93% graded aggregate, 0.24% polymer and 1% crumb rubber.

14. A method as claimed in claim 10 wherein said rubber has a mesh size of between 4 to 100.

15. A method as claimed in claim 10 wherein said mesh size is between 6 to 20.

16. A method as claimed in claim 10 wherein said mesh size is between 8 to 10.

17. A method as claimed in claim 10 wherein said paving composition comprises 5.76% by weight asphalt cement, 93% graded aggregate, 0.24% SBR polymer and 1% crumb rubber, said crumb rubber having a mesh size of between 8 to 10.

* * * * *